United States Patent [19]
Allen

[11] 3,710,382
[45] Jan. 9, 1973

[54] SECONDARY RADAR

[75] Inventor: Alaric Allen, Stortford, England

[73] Assignee: A. C. Cossor Limited, Harlow, Essex, England

[22] Filed: Aug. 26, 1971

[21] Appl. No.: 175,062

[30]  Foreign Application Priority Data

April 14, 1971 Great Britain..................9,402/71

[52] U.S. Cl.............343/6.5 R, 343/5 R, 343/11 R, 343/876
[51] Int. Cl...........................G01s 9/02, H01q 21/06
[58] Field of Search........343/5 R, 6.5 R, 11 R, 16 R, 343/876

[56]  References Cited

UNITED STATES PATENTS

| 2,997,706 | 8/1961 | Easy et al.............................343/5 R |
| 3,160,881 | 12/1964 | Pederzani et al................343/11 R X |
| 3,430,242 | 2/1969 | Safran..............................343/5 R X |

*Primary Examiner*—T. H. Tubbesing
*Attorney*—Dike, Bronstein, Roberts & Cushman

[57]  ABSTRACT

To increase the data rate of a mechanically scanning radar aerial, two aerials on a common support share a common rotating joint to which they are alternately switched under remote control, preferably in response to burst of RF power transmitted from the aerial.

5 Claims, 1 Drawing Figure

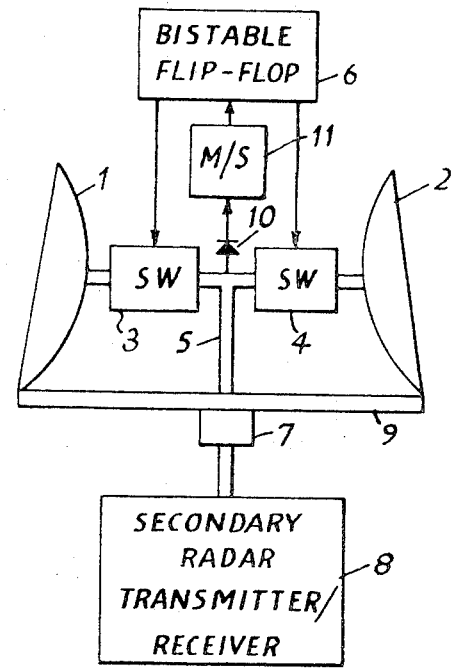

SECONDARY RADAR

Secondary radar provides a means of measuring the positions of suitably equipped aircraft and this information is of use in an air traffic control system. In such a system it is important to have a high rate of flow of positional information so that aircraft can be tracked sufficiently accurately and aircraft newly arrived in the system can be picked up quickly enough.

Present secondary radar installations use mechanically rotating directional aerials. The data rate can be increased by rotating the aerial more quickly, but the maximum practicable rate or rotation still may not provide a high enough rate of data flow. The data rate may be doubled by mounting two aerials back to back, but this method of increasing the data rate has the disadvantage of doubling the number of feeds to the aerial system.

The object of this invention is to provide an aerial system which enables the data rate to be substantially increased.

According to the invention there is provided a secondary radar aerial system comprising a plurality of directional aerials mounted on a common rotatable support to face in different directions, the aerials being connected to a common rotating joint by way of switching means operable under remote control to couple the aerials in turn to the rotating joint.

Preferably the switching means are controlled by RF power. Control could be effected via slip rings, but there is then a risk of unreliable operation because of the noise generated by the slip rings and the difficulty in sending control pulses with fast edges via slip rings. Therefore, in a preferred embodiment of the invention the switching means are controlled by means of logic triggered by the bursts of power transmitted by the radar system. Thus, the logic detects a burst, waits long enough for replies to be received and then disconnects the aerial just used and connects the next required aerial to the rotating joint.

There may be just two aerials mounted back to back, although a different angular relationship may be appropriate in some special applications and more than two aerials can be used, e.g. three aerials at 120° intervals.

Each aerial can be a single aperture aerial requiring only one channel between it and the transmitter/receiver of the secondary radar system. Only a single channel rotating joint is then required, as in the simple embodiment described below. However, the advantages of the invention become greater with more complex aerial systems. For example, if monopulse techniques are employed, each aerial has two separately fed apertures and requires a two channel rotating joint. The present invention enables one such joint to be shared between two or more aerials. If two monopulse aerials were separately fed through a rotating joint, a four channel joint would be required. Such joints are expensive and troublesome to instal and maintain.

One embodiment of the invention will now be described in more detail, by way of example, with reference to the drawing.

A secondary radar transmitter and receiver system 8 is connected via a single channel rotating joint 7 to an aerial system assembly mounted on a rotating platform 9. The assembly comprises two directional aerials 1 and 2 mounted back to back. The aerials are connected via switches 3 and 4 to a common feed channel 5 connected to the rotating joint 7.

The switches 3 and 4 can comprise forward and reverse biased PIN diodes, switch switches being well known per se. The states of the switches are controlled by a bistable flip-flop 6 and it is arranged that each burst of transmitted RF power switches the state of the flip-flop after a suitable delay. To this end a diode 10 detects a small fraction of the transmitted power and triggers a monostable delay circuit 11 which switches over the flip-flop 6 after a suitable delay allowing replies to be received from maximum range. Thus in this system interrogation proceeds alternately in substantially opposite directions, with the whole horizon being scanned in half the time in would take to scan it using a single aerial.

The detailed arrangement of the control circuits for the switches 3 and 4 can be varied in many ways. It may, for instance, be arranged to detect the interrogation of the switches 3 and 4 themselves and more complicated circuitry could be used to recognize an interrogation pattern and respond differently to different patterns of transmitted power.

What is claimed is:

1. A secondary radar aerial system comprising a rotatable support, a plurality of directional aerials mounted on said support to face in different directions, means for rotating said support to cause the aerials to effect scanning, a common rotating joint for said aerials, switching means for selectively coupling said aerials to said joint, and remote control means for operating said switching means.

2. A system according to claim 1, wherein there are two aerials mounted back to back on said support.

3. A system according to claim 1, wherein said remote control means comprise means for detecting RF power transmitted by said system and means responsive to the detected power to operate said switching means.

4. A system according to claim 3, wherein said remote control means include means for delaying operation of said switching means for a time sufficient to allow replies to the transmitted power to be received from transponders at maximum range.

5. A system according to claim 3, wherein the aerials are two in number and said means responsive comprise a bistable flip-flop arranged to change state in response to each detection of transmitted power and arranged to operate the switching means for the two aerials alternately.

* * * * *